United States Patent [19]

Magnin

[11] Patent Number: 4,627,213

[45] Date of Patent: Dec. 9, 1986

[54] METHOD OF CONSTRUCTING A NUCLEAR POWER STATION

[75] Inventor: Raymond Magnin, Nanterre, France

[73] Assignee: Framatome, Courbevoie, France

[21] Appl. No.: 506,920

[22] Filed: Jun. 22, 1983

Related U.S. Application Data

[62] Division of Ser. No. 194,131, Oct. 6, 1980, Pat. No. 4,416,849.

[30] Foreign Application Priority Data

Nov. 14, 1979 [FR] France ................................ 79 28067

[51] Int. Cl.⁴ ............................................. G21C 13/00
[52] U.S. Cl. ........................................ 52/745; 52/741; 376/293; 376/296
[58] Field of Search ............................ 376/293–296, 376/273, 912; 52/741, 293, 224, 246, 31, 29, 745

[56] References Cited

U.S. PATENT DOCUMENTS

| | | | |
|---|---|---|---|
| 3,514,909 | 6/1970 | Nevarez | 52/246 |
| 3,752,738 | 8/1973 | Naymark | 376/293 |
| 4,015,383 | 4/1977 | Crowley | 52/246 |
| 4,065,905 | 1/1978 | van der Lely | 52/741 |
| 4,187,659 | 2/1980 | Blachura | 52/745 |
| 4,198,797 | 4/1980 | Soble | 52/745 X |
| 4,297,167 | 10/1981 | Schabert | 376/293 X |
| 4,416,849 | 11/1983 | Magnin | 376/296 |
| 4,442,651 | 4/1984 | Cappe | 52/745 |
| 4,476,087 | 10/1984 | Hista | 376/293 X |

FOREIGN PATENT DOCUMENTS

| | | | |
|---|---|---|---|
| 0029775 | 6/1981 | European Pat. Off. | 376/293 |
| 2704750 | 8/1978 | Fed. Rep. of Germany | 52/224 |
| 2925366 | 1/1980 | Fed. Rep. of Germany | 52/224 |

*Primary Examiner*—Deborah L. Kyle
*Assistant Examiner*—Dan Wasil
*Attorney, Agent, or Firm*—Pollock, Vande Sande & Priddy

[57] ABSTRACT

Nuclear power plant with a reactor building, a fuel building, buildings for the ancillary nuclear, electrical and safety equipment, and a building for turbo-electric machines.

The group of buildings is in the general shape of a T, with the fuel and ancillary equipment buildings (2) and (3) in line at both sides of the reactor building, and the engine building (6) facing the reactor building (1) and perpendicular to the latter. The vault of the protective enclosure is connected to the foundation of the reactor building and is in the shape of a cylinder with horizontal generatrices.

The invention is applicable to light water nuclear power stations.

3 Claims, 7 Drawing Figures

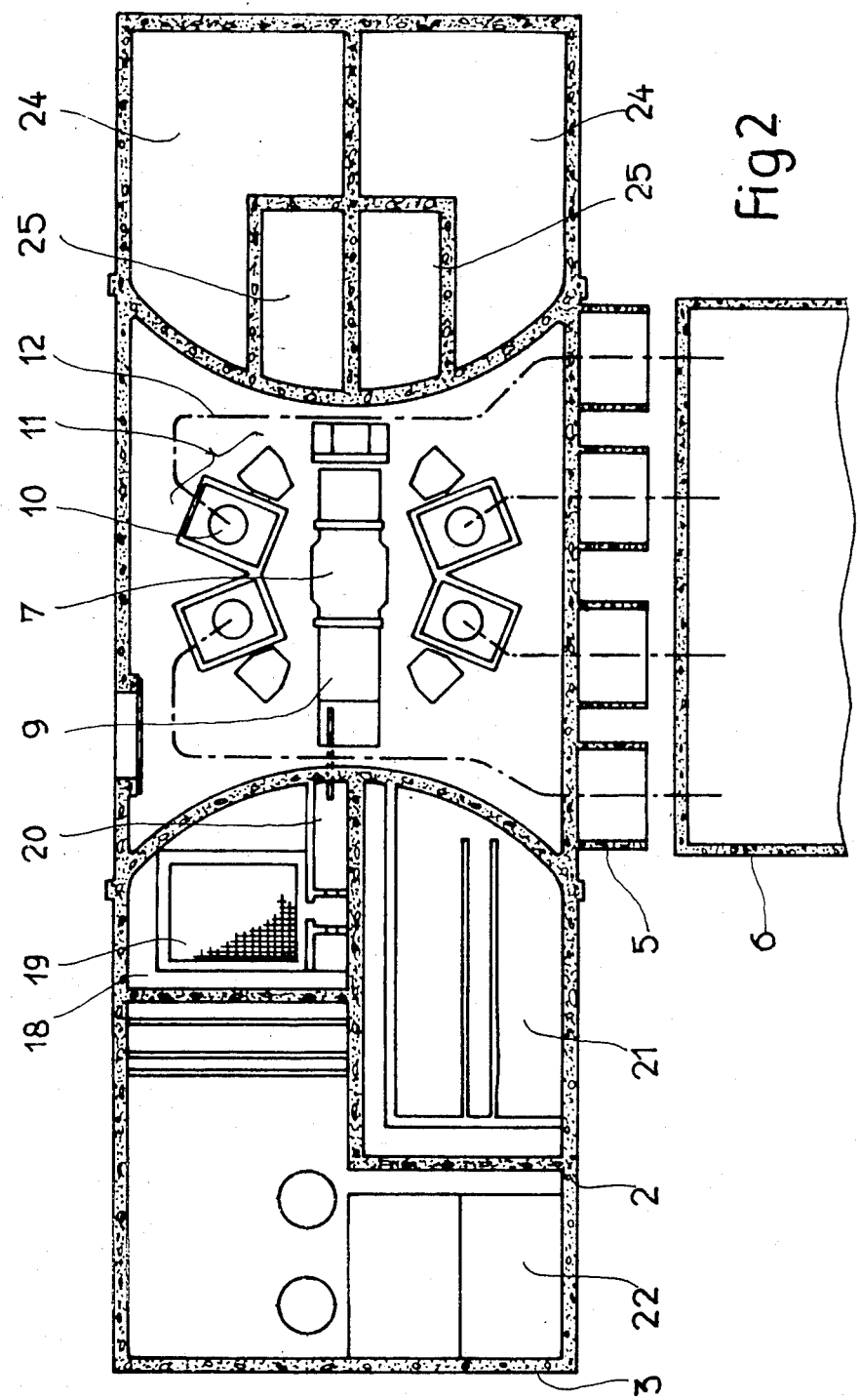

METHOD OF CONSTRUCTING A NUCLEAR POWER STATION

This is a division of application Ser. No. 194,131, filed on 10/6/80, now U.S. Pat. No. 4,416,849.

BACKGROUND OF THE INVENTION

The present invention concerns a new nuclear power plant, more particularly for a light water power station. It also concerns a method of constructing such a power station.

The plant as a whole for a nuclear power station has to date been organized around a central building termed the "reactor building" containing the core of the reactor and the primary cooling circuit loops, and in particular the steam generators. In known plants, the reactor building is in the form of a very tall concrete structure, in the shape of a circular cylinder with vertical axis. The building containing the electric turbogenerators or engine room, the building for the fuel as well as the various ancillary buildings are then distributed all around the reactor building.

This conventional arrangement, which as far as use of the power station is concerned, is generally satisfactory, does, however, present the disadvantage of causing considerable delays in construction. In practice, the construction of a conventional power station of the light water type and in particular the complete erection of the reactor building at present involves two stages.

The first stage is that of constructing the building, properly so-called, or the civil engineering phase of execution. It involves constructing a concrete foundation on which the various concrete elements are mounted, such as the biological shields, the protective chambers for the steam generators, etc. At the upper part of the vessel, a revolving bridge is then mounted which will be used first for putting heavy equipment in position and then, during use, for various handling operations.

The second stage is that of putting heavy equipment in position, which can only be done after completion of the first stage. In practice the cleanness required for the pieces of equipment constituting the circulation loops of the primary fluid between the reactor-core and the steam generators makes it impossible to carry out heavy civil engineering work in their vicinity. Furthermore, it is at present necessary for the revolving bridge to be in position at the upper part of the enclosure so that the heavy units, such as the reactor vessel, the pressurizer or the steam generators can be put in position. An additional fact is that access to the site of the reactor building is made difficult by the presence all around the construction sites of attached buildings. It will also be noted that maneuvering at the bridge of the steam generators, which have been brought into the building at the level of the working floor, necessitates setting them upright again and then raising them by a height which is sufficient to bring them to the vertical on their supports in the protective chambers before they are left in position there. This makes it necessary to have considerable height under the bridge and consequently for the reactor building to have a considerable height, which increases its cost and its sensitivity to earthquakes and makes it essential to increase its strength.

SUMMARY OF THE INVENTION

The present invention leads to a general overall architecture for the various buildings of a nuclear power station which is such that the various construction operations can easily overlap, allowing the site to be better organized and time and construction costs to be reduced.

The invention is applicable to a nuclear power plant, the various principal buildings constructed on a foundation consisting of:
  a reactor building with the reactor core and a primary cooling circuit between the core and at least one steam generator,
  a fuel building for the handling of new and used fuel,
  buildings for the ancillary nuclear, electrical and safety equipment and,
  an engine building for the turbogenerator units.

According to the invention, the group of buildings is arranged in the general shape of a T, with the fuel and ancillary buildings arranged in line and adjacent either side of the reactor building, the engine building being disposed facing and perpendicular to the reactor building; in the case of the reactor building, at least, the vault of the protective enclosure is connected to the foundation and is in the form of a cylinder with horizontal generatrices parallel to the longitudinal axis of the reactor building and the ancillary buildings.

According to a preferred embodiment of the invention, at least in the case of the reactor building, the vault of the protective enclosure and the foundation are united rigidly so as to constitute a monolithic tubular assembly, the thick lower part of which is constituted by the foundation, and so as to allow the vault to be pre-stressed on the foundation.

The invention is also applicable to the method of constructing such a power station. According to the invention, concurrently with the construction and equipping of the engine building, procedure is according to the following successive phases:
  (a) construction of the supporting foundation for the reactor building and the ancillary buildings,
  (b) establishing of service tracks parallel with and on both sides of the frame, with positioning of lifting and transporting means on these service tracks,
  (c) construction of concrete inner structures of the reactor building and the attached buildings, with units prefabricated on an auxiliary site and brought and put in position by the lifting and transporting means,
  (d) simultaneously, as their supports are constructed and using the same means of lifting and transporting, positioning of large pieces of equipment in their respective buildings,
  (e) putting in position of the vault of the protective enclosure of the reactor building, made of units prefabricated on an auxiliary site, brought to their locations by the lifting and transporting means running on the service tracks and then assembled together to form a continuous vault.

The invention will be better understood by referring to a particular embodiment given by way of example and represented by the attached drawings.

BRIEF DESCRIPTION OF THE DRAWINGS

FIGS. 2 and 3 show in more detail the inner arrangement of the buildings. FIG. 2 is a plan view of the reactor building and the ancillary nuclear and safety equipment buildings; FIG. 3 is an elevation in transverse section of the reactor building.

FIG. 4 is an overall plan of the site; FIGS. 5, 6 and 7 show three characteristic stages of the construction of the reactor building.

DETAILED DESCRIPTION OF AN EMBODIMENT

Figure 1:
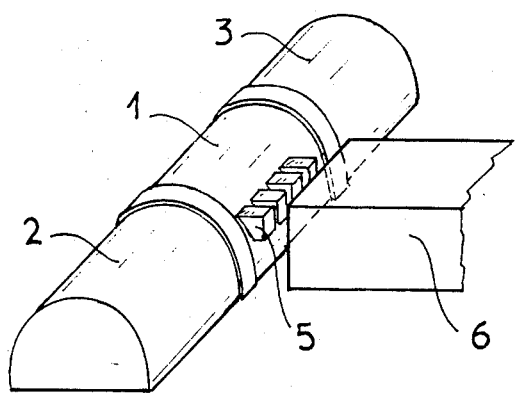
FIG. 1 is an overall plan in perspective on a very small scale showing, in accordance with the invention, the new relative arrangement of the various buildings constituting the nuclear power station.

Firstly, in FIG. 1, the general organization of the power station is shown in the shape of a T, with the reactor building 1 in the center, extended on both sides and in the same line by the building 2 for the ancillary nuclear equipment and the building 3 for the ancillary electrical and safety equipment. The reactor building here includes four cooling loops and four protective chambers 5 for outlet of the steam pipes to the engine room 6.

Figure 3:
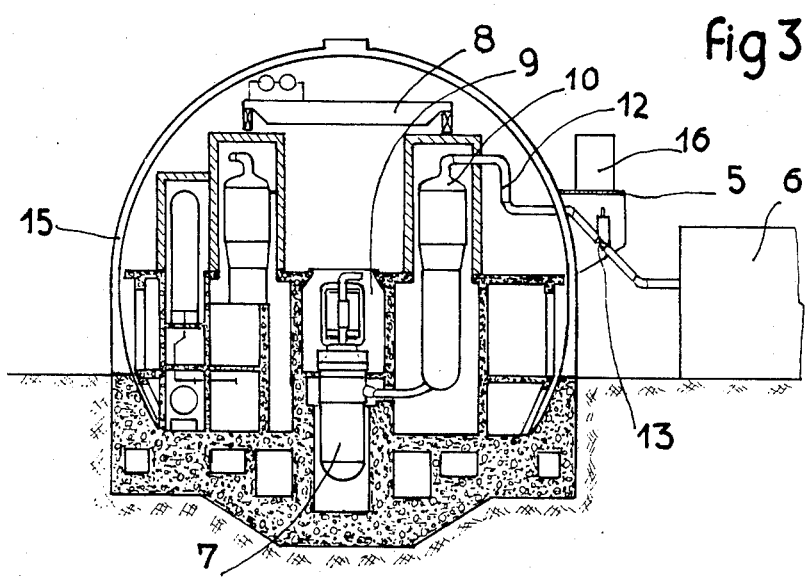
Figure 4:
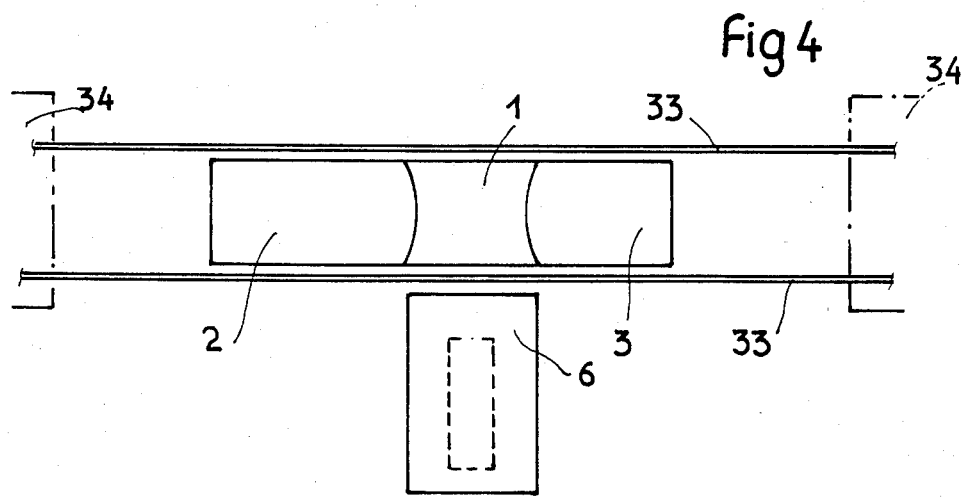
FIGS. 4 to 7 illustrate the new method of constructing such a power station.
Figure 5:
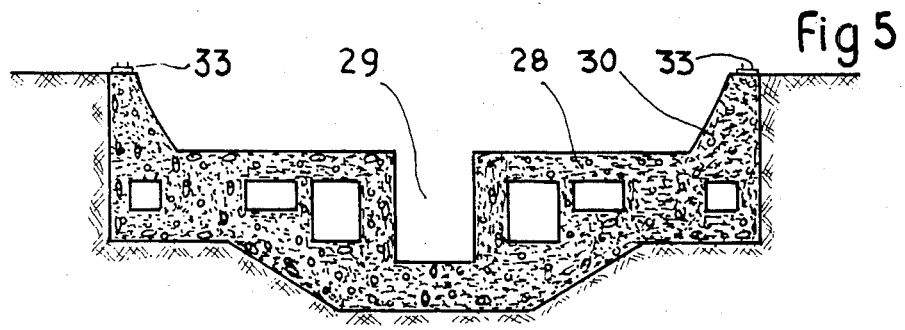

FIGS. 2 and 3 show the inner arrangement of the buildings, and more particularly of the reactor building, in more detail. Thus, in the reactor building 1, there is the vessel 7 for the reactor core, with a travelling crane 8 for handing pieces of equipment inside and the swimming pool 9 for the reactor. Each primary water circulation loop between the core 7 and a steam generator 10, with a circulating pump, is represented here very diagrammatically by a unit 11, from which a steam pipe 12 issues. A principal isolating valve in a protective chamber 5, after passing through the protective enclosure 15, is more easily visible in FIG. 3. The series of safety valves will be disposed at 16 above the protective chamber.

In the adjacent attached building 2, the fuel building 18 occurs first with the racks 19 for storing fuel assemblies and the lock 20 for communication with the reactor swimming pool.

The region 21 of the building 2 constitutes a first building for ancillary nuclear equipment, with the make-up water and the circuit for monitoring the primary circuit volumetrically and chemically. The region 22, also for ancillary nuclear equipment, includes demineralization filters and the circuit for treating effluents.

On the other side of the reactor building, the building 3 has ancillary electrical equipment 24 and ancillary safety equipment 25.

A short description of the development of the construction of the power station, illustrated by FIGS. 4 to 7, will now show how the arrangement just described allows a reduction in the length of time required overall to construct the power station.

After the excavation work, construction of the foundation 28 with the reactor vessel pit 29 and piers 30 and then filling in, if necessary, can take place. A single foundation is preferably made for the reactor building and the ancillary buildings around it, so that a monolithic assembly is obtained which will resist earthquakes. Alongside, service tracks 33, for allowing cranes or any other lifting and transporting means to run, and which are parallel and on both sides of the foundation, are then constructed. The tracks 33 extend to two prefabrication sites 34, at each end of the site as a whole.

Figure 6:
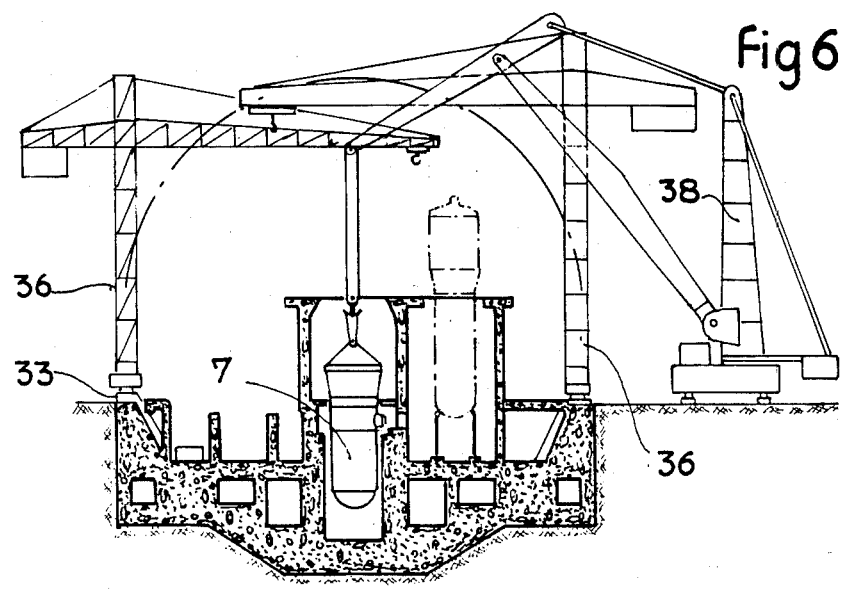
Figure 7:
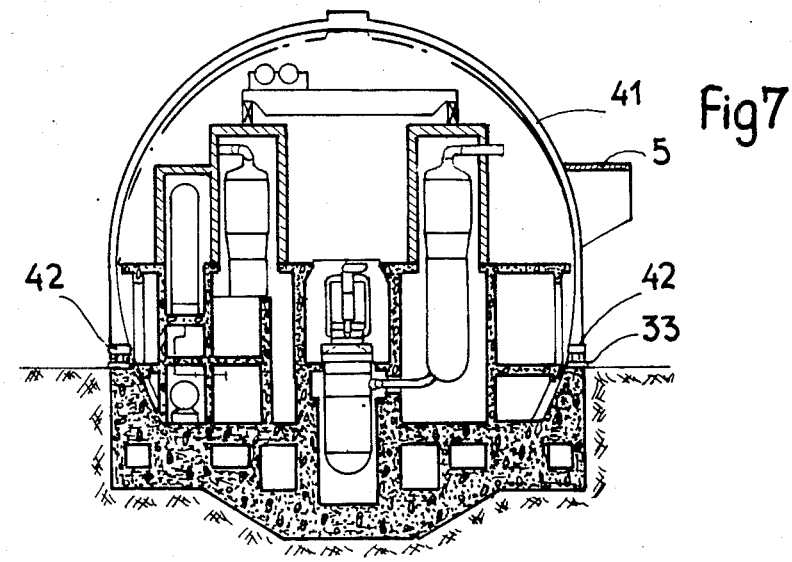

A last stage, better illustrated by FIG. 6, exhibits the positioning and assembling of the inner structures of the reactor building, such as, for example, the reactor vessel pit and the protective chambers for the steam generator. The units of these structures are prefabricated on one of the sites 34 and then put in position by means of light cranes 36 running on the tracks 33, and by a high-capacity crane 38. Assembly of the units can then be carried out by any conventional means. Any type of lifting means adapted to the units to be installed will, of course, be used, and the cranes represented in a simplified way in the drawing could, if necessary, be replaced by portal cranes straddling the whole width of the foundation.

It will be noted that the site is cleaned very rapidly, the presence on the site of machines for producing concrete not being necessary for the single operations of connecting the prefabricated units. In these conditions, heavy pieces of equipment can be brought in very rapidly, as fast as their supports can be keyed, and without waiting for civil engineering works to be entirely finished. Thus, in FIG. 6, putting the vessel 7 in position by means of the crane 38 is represented. The same applies for putting the steam generators, the pressurizer and the pumps in position.

The complete accessibility of the entire site, each building being accessible from both sides at the same time and over its whole length, will again be noted. This accessibility, combined with the technique of prefabrication, allows construction to progress simultaneously with putting pieces of equipment in position.

When all the inner structures are finished and the equipment is in place, all that remains to be done is to cover the whole structure with the vault of the protective enclosure. The vault can be made of prefabricated units, each consisting of self-supporting sections. Each unit to be juxtaposed to form the enclosure can be prefabricated on one of the sites 34 and then brought on site up to the reactor building by simple translation along the tracks 33. Such an element 41 carried by carriages 42 can be seen in more detail in FIG. 7. Once in correct longitudinal position, the unit can be taken up by jacks so that the carriages can be disengaged, and then lowered into its final position, represented in chain-dotted lines.

After positioning, the vault is rigidly united with the foundation so as to obtain a tubular assembly whose thick lower part is constituted by the foundation, and which facilitates the prestressing of the continuous vault.

Positioning of the superstructures of the ancillary buildings can be carried out in the same way, operations for the reactor building, as for the ancillary buildings, being able to be carried out at both ends at once. A continuous tubular construction is thus obtained.

Lastly, it will be noted that the embodiment of the power station as just described not only allows time to be saved in work on the site but also lessens the height below the vault of the power station, since this height no longer depends on the space which is necessary for re-erecting the steam generators; the power station is then more stable in earthquakes.

The invention is not, of course, strictly limited to the embodiment which has just been described by way of example; it also covers embodiments which differ only in detail, variants of execution or the use of equivalent means. Thus, it is not strictly essential for the transverse section of the ancillary buildings to be exactly the same as that of the reactor building they surround. Each ancillary building could also conceivably be constructed on an independent foundation, the foundations being then connected in a conventional manner. Most importantly, they must be aligned with the reactor building, so as to form a site which is easily accessible overall via parallel service tracks, even if the covering of the ancillary buildings has less height. However, it can be noted that having identical vaults for the reactor building and the ancillary buildings will facilitate prefabrication of their units, simplify the operations involved in putting them in position, and allow continuous tubular construction on a single foundation.

Similarly, any method of constructing the vault of the protective enclosure of the reactor building other than the forming of self-supporting units is conceivable, provided these other methods, which can be conventional, allow prefabrication and easy assembly on site.

It can also be observed that, if the site requires, the prefabrication sites can be further away, additional handling then having to be provided to bring the prefabricated units to the site of the power station and take them up by the service cranes 36 or 38 of the site.

I claim:

1. Method of constructing on a single one-piece foundation a nuclear power station comprising a reactor building (1) containing a reactor core and a primary cooling circuit between said core and at least one steam generator, a fuel building (2) for processed new and used fuel, an ancillary building (3) for nuclear, electrical and safety equipment and an engine building (6) for turbogenerator units, said buildings being arranged in the general shape of a T, said fuel building (2) and ancillary building (3) being arranged in line and adjacent either side of said reactor building (1) which is perpendicular to the said engine building, and pre-fabricated vaulted enclosures having identical profiles for each of said buildings (1, 2, 3) and rigidly connected with said foundation, said vaults having a generally cylindrical shape with horizontal generatrices parallel to the longitudinal axes of said buildings (1, 2, 3), said method comprising the steps of (a) constructing a single one-piece foundation for supporting all of said reactor, fuel and ancillary buildings (1, 2, 3);

(b) laying service tracks (33) parallel to and on both sides of said foundation;

(c) positioning lifting and transport means (36, 38) on said service tracks;

(d) constructing concrete inner structures of said buildings (1, 2, 3) of pre-fabricated units brought and positioned by said lifting and transport means;

(e) placing large pieces of said nuclear, electrical and safety equipment in place in said ancillary building while concurrently constructing and positioning supports for said equipment with the aid of said lifting and transport means;

(f) positioning said vaulted enclosures on said foundation (28) with the aid of said lifting and transport means; and (g) assembling said vaulted enclosures to form one continuous vaulted enclosure for said buildings.

2. Method according to claim 1, wherein, after assembly of said continuous vaulted enclosure, the same is rigidly joined at its base to said foundation so as to form a monolithic tubular assembly the thick lower part of which is constituted by said foundation.

3. Method according to claim 1, wherein sites for pre-fabricating said concrete inner structures and said vaulted enclosures are arranged on direct extensions of said service tracks (33).

* * * * *